United States Patent
Kost

(10) Patent No.: US 8,849,615 B2
(45) Date of Patent: Sep. 30, 2014

(54) METHOD AND SYSTEM FOR SEMICONDUCTOR PROCESS CONTROL AND MONITORING BY USING A DATA QUALITY METRIC

(75) Inventor: Daniel Kost, Dresden (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 633 days.

(21) Appl. No.: 12/685,022

(22) Filed: Jan. 11, 2010

(65) Prior Publication Data
US 2010/0198556 A1 Aug. 5, 2010

(30) Foreign Application Priority Data
Jan. 30, 2009 (DE) .......................... 10 2009 006 887

(51) Int. Cl.
*G06F 11/30* (2006.01)
*G05B 23/02* (2006.01)

(52) U.S. Cl.
CPC .......... *G05B 23/0221* (2013.01); *G05B 23/024* (2013.01)
USPC ....................................................... 702/185

(58) Field of Classification Search
CPC .......................... G05B 23/024; G05B 23/0221
USPC ................................................. 702/183, 185
See application file for complete search history.

(56) References Cited

U.S. PATENT DOCUMENTS

| | | | |
|---|---|---|---|
| 7,328,126 B2* | 2/2008 | Chamness | 702/182 |
| 7,937,164 B2* | 5/2011 | Samardzija et al. | 700/28 |
| 2006/0095232 A1* | 5/2006 | Purdy | 702/185 |
| 2009/0177404 A1* | 7/2009 | Hartmann et al. | 702/9 |

FOREIGN PATENT DOCUMENTS

| | | | |
|---|---|---|---|
| WO | WO 2004/003671 A1 | 1/2004 | G05B 19/418 |
| WO | WO 2008/085706 A1 | 7/2008 | G05B 23/02 |

OTHER PUBLICATIONS

Translation of Official Communication from German Patent Office for German Patent Application No. 10 2009 006 887.2-31 dated Oct. 14, 2009.

* cited by examiner

*Primary Examiner* — John Breene
*Assistant Examiner* — Stephanie Bloss
(74) *Attorney, Agent, or Firm* — Amerson Law Firm, PLLC

(57) ABSTRACT

During fault detection of a production process, the influence of the data communication process for communicating measurement readings to the fault detection system may be taken into consideration. In one illustrative embodiment, a data rate related parameter may be used as an input variable for a data reduction procedure, thereby enabling an efficient assessment of the quality of the remaining "real" process and tool parameters.

20 Claims, 6 Drawing Sheets

|        | Parameter 1 | Parameter 2 | ... | Parameter m | Basis function 1 |
|--------|-------------|-------------|-----|-------------|------------------|
| wafer 1 | 0,7 | 0,8 |  | 0,7 | 0,8 |
| wafer 2 | 1,1 | 0,3 |  | 1,2 | 0,3 |
| ⋮ |  |  |  |  |  |
| wafer i | 0,5 | 0,9 |  | 0,7 | 1,1 → fault alarm |
| wafer j | 0,3 | 0,6 |  | 0,4 | 1,4 → fault alarm |
| ⋮ |  |  |  |  |  |
| wafer n | 0,7 | 0,5 |  | 0,8 | 0,5 |

$$\left.\begin{array}{l} MP1(t_1) \\ MP1(t_2) \\ \vdots \\ MPM(t_n) \end{array}\right\} \begin{array}{l} QM1 = t_2-t_1 \\ QM2 = t_3-t_2 \\ \\ QM_{n-1} = t_n-t_{n-1} \end{array}$$

$$\Downarrow$$

PCA quality input =

$$\frac{1}{n-1} \sum_{i=1}^{n-1} QM_i$$

|        | Quickly | Pure 1 | Pure 2 | ... | Pure n | Basis1 |
|--------|---------|--------|--------|-----|--------|--------|
| wafer 1 | 0,2 | 0,7 | 0,8 |  | 0,7 | 0,8 |
| wafer 2 | 0,4 | 1,1 | 0,3 |  | 1,2 | 0,3 |
| ⋮ |  |  |  |  |  |  |
| wafer i | 0,3 | 0,5 | 0,9 |  | 0,7 | 1,1 |
| wafer j | 3,4 | 0,3 | 0,6 |  | 0,4 | 1,4 |
| ⋮ |  |  |  |  |  |  |
| wafer n | 0,5 | 0,7 | 0,5 |  | 0,8 | 0,5 |

FIG. 1k

METHOD AND SYSTEM FOR SEMICONDUCTOR PROCESS CONTROL AND MONITORING BY USING A DATA QUALITY METRIC

BACKGROUND OF THE INVENTION

1. Field of the Invention

The present disclosure generally relates to the field of fabricating semiconductor devices, and, more particularly, to process control and monitoring techniques, such as fault detection and classification, for manufacturing processes, wherein an improved process quality may be achieved by detecting process failures on the basis of production data.

2. Description of the Related Art

Today's global market forces manufacturers of mass products to offer high quality products at a low price. It is thus important to improve yield and process efficiency to minimize production costs. This holds especially true in the field of semiconductor fabrication, since, here, it is essential to combine cutting-edge technology with mass production techniques. It is, therefore, the goal of semiconductor manufacturers to reduce the consumption of raw materials and consumables while at the same time improve product quality and process tool utilization. The latter aspect is especially important since, in modern semiconductor facilities, equipment is required which is extremely cost intensive and represents the dominant part of the total production costs. For example, in manufacturing modern integrated circuits, several hundred individual processes may be necessary to complete the integrated circuit, wherein failure in a single process step may result in a loss of the complete integrated circuit. This problem is even exacerbated in that the size of substrates, on which a plurality of such integrated circuits are processed, steadily increases, so that failure in a single process step may possibly entail the loss of a very large number of products.

Therefore, the various manufacturing stages have to be thoroughly monitored to avoid undue waste of man power, tool operation time and raw materials. Ideally, the effect of each individual process step on each substrate would be detected by measurement and the substrate under consideration would be released for further processing only if the required specifications, which would desirably have well-understood correlations to the final product quality, were met. A corresponding process control, however, is not practical, since measuring the effects of certain processes may require relatively long measurement times, frequently ex situ, or may even necessitate the destruction of the sample. Moreover, immense effort, in terms of time and equipment, would have to be made on the metrology side to provide the required measurement results. Additionally, utilization of the process tool would be minimized since the tool would be released only after the provision of the measurement result and its assessment. Furthermore, many of the complex mutual dependencies of the various processes are typically not known, so that an a priori determination of respective process specifications may be difficult.

The introduction of statistical methods, also referred to statistical process control (SPC), for adjusting process parameters significantly relaxes the above problem and allows a moderate utilization of the process tools while attaining a relatively high product yield. Statistical process control is based on the monitoring of the process output to thereby identify an out-of-control situation, wherein a causality relationship may be established to an external disturbance. After occurrence of an out-of-control situation, operator interaction is usually required to manipulate a process parameter so as to return to an in-control situation, wherein the causality relationship may be helpful in selecting an appropriate control action. Nevertheless, in total, a large number of dummy substrates or pilot substrates may be necessary to adjust process parameters of respective process tools, wherein tolerable parameter drifts during the process have to be taken into consideration when designing a process sequence, since such parameter drifts may remain undetected over a long time period or may not be efficiently compensated for by SPC techniques.

Recently, a process control strategy has been introduced and is continuously being improved, allowing enhanced efficiency of process control, desirably on a run-to-run basis, while requiring only a moderate amount of a measurement data. In this control strategy, the so-called advanced process control (APC), a model of a process or of a group of interrelated processes, is established and implemented in an appropriately configured process controller. The process controller also receives information including pre-process measurement data and/or post-process measurement data as well as information related, for instance, to the substrate history, such as type of process or processes, the product type, the process tool or process tools, in which the products are to be processed or have been processed in previous steps, the process recipe to be used, i.e., a set of required sub-steps for the process or processes under consideration, wherein possibly fixed process parameters and variable process parameters may be contained, and the like. From this information and the process model, the process controller determines a controller state or process state that describes the effect of the process or processes under consideration on the specific product, thereby permitting the establishment of an appropriate parameter setting of the variable parameters of the specified process recipe to be performed with the substrate under consideration.

Even though APC strategies may significantly contribute to yield improvement and/or enhanced device performance and/or a reduction of production cost, nevertheless, a statistical probability exists that even process results obtained by using an APC technique may be outside of predefined value ranges, thereby resulting in yield loss. In high-volume production lines, even short delays between the occurrence of an out-of-control situation, indicating for instance an equipment failure, and its detection may lead to substantial monetary losses. Consequently, it may be advantageous to apply fault detection and classification (FDC) techniques in combination with other control strategies, such as APC and/or SPC, so as to detect even subtle variations of the process sequence or the overall process, since the non-detected shift of the process may result in a large number of semiconductor devices of insufficient quality.

In conventional fault detection and classification techniques, a very large number of process parameters may have to be monitored and analyzed in order to detect a deviation from a target behavior of the manufacturing environment under consideration. As previously explained, several hundred process steps may typically be required for completing sophisticated integrated circuits, wherein each of these steps has to be maintained within specified process margins, wherein, however, the mutual interaction of the highly complex manufacturing processes on the finally obtained electrical performance of the completed device may not be known. Consequently, even a deviation of the plurality of processes within the specified process windows may result in a significant variation of the finally obtained process result. For this reason, a plurality of metrology steps are typically incorporated into the overall manufacturing flow, wherein, due to overall throughput and in view of data processing capability, typically, a selected number of sample substrates may be subjected to measurement, based on which appropriate control mechanisms may be performed and also the overall quality of manufacturing sequences may be evaluated with respect to any faults. Moreover, a certain classification of detected faults may also be accomplished on the basis of the sample measurements. Although the respective measurement steps may be restricted to a defined number of samples, the continuously increasing complexity of the overall manufacturing process may require the monitoring of a large number of process parameters, such as layer thicknesses of critical process layers, such as the gate dielectric material and the like, critical dimensions of certain circuit components, such as gate electrodes, doping levels, strain levels, sheet resistivity and the like, wherein many of these process parameters may have to be monitored for a plurality of different device levels, for instance for a plurality of metallization levels and the like. Consequently, it may be extremely difficult to reliably evaluate the quality of a production process, since taking into consideration only a restricted number of process parameters may result in a less meaningful estimation since the mutual interactions of the various process steps may not be known in advance, while monitoring a high number of process parameters may involve complex data processing algorithms to detect relevant parameters and their deviation from target values on the basis of very large data sets.

For this reason, efficient statistical data processing algorithms may be used, which may enable a significant reduction of the high dimensionality of the parameter space, while substantially not losing valuable information on the intrinsic characteristics of the overall process flow, which may be encoded into the measurement data in a more or less subtle manner. For this purpose, statistical algorithms, such as "k" nearest neighbors (KNN) analysis, principal component analysis (PCA) and the like, have proven to be powerful tools for evaluating a large number of measurement data relating to a large number of parameters, thereby achieving the desired degree of data reduction without loosing valuable information on the process conditions under consideration. For example, the principal component analysis may be used for fault detection and classification by establishing a "model" of the process sequence under consideration, in that appropriately selected measurement data, which may act as reference data, may be used to identify respective "new" parameters as a linear combination of the many process parameters under consideration, wherein the new parameters or principal components may represent respective entities having the mostly pronounced influence on the variability of the process output for a given set of input parameters. Thus, typically, a significantly reduced number of "new" parameters, or principal components or vectors of the multi-dimensional parameter space, may be identified by the PCA formalism which may be "monitored" in order to detect a deviation in current measurement data that describe the current status of the high-dimensional parameter space and thus of the process conditions corresponding to the high-dimensional parameter space. When the initial measurement data for which a corresponding data reduction may have been performed are considered "good" data, the respective transformations and correlation and co-variance components may be used as a model of the process or process sequence under consideration, which may be applied to other measurement data relating to the same set of parameters in order to determine a deviation between the model prediction and the current measurement data. When a corresponding deviation is detected, the measurement data evaluated by the PCA model may thus be considered as referring to a faulty state of the manufacturing environment. A corresponding deviation may be determined on the basis of statistical algorithms, so that the PCA model in combination with the statistical algorithms may allow an efficient detection and also classification of the status of the manufacturing environment corresponding to the available measurement data.

For example, in sophisticated manufacturing processes, such as plasma assisted etch sequences and the like, a plurality of tool parameters may have to be monitored, such as flow rates of precursor gasses, high frequency and/or low frequency powers, resulting bias voltages, pressure in the tool atmosphere, the status of certain mechanical components, the temperature and coolant flow and the like. Consequently, a moderately high number of tool or process parameters may be continuously monitored during the processing of substrates in order to assess the quality of the process conditions during the processing of each individual substrate. For example, a predetermined frequency gathering measurement data representing the plurality of process parameters may be applied in order to obtain the corresponding measurement readings, which may be accomplished by appropriately reading out tool internal "sensors" or any other measurement devices that may be responsive to a tool control unit. Consequently, a moderately high amount of measurement data may have to be communicated to the fault detection system to obtain an assessment of the current process conditions with a desired high reliability and without a significant delay in order to enable a short-term response to any out-of-control situations indicated by the fault detection system. As explained above, the fault detection system may monitor one or more "newly defined" parameters, i.e., corresponding linear combinations of the high dimensional parameter space, which have been identified by, for instance, the PCA algorithm, as appropriate candidates for reflecting the current status of the process under consideration. For example, a corresponding basis function or basis vector of the high dimensional parameter space, which may represent the direction of greatest variability, may be used to identify an out-of-control situation, for instance, by comparing a current value of the basis function with a reference function obtained on the basis of "good" measurement readings, as discussed above. Although the data reduction techniques, such as the PCA technique, may allow the assessment of a large number of individual parameters having subtle and frequently not well-understood mutual interactions with each other, the reliability of identifying out-of-control situations is less than expected since a plurality of "false alarms" may be triggered by conventional fault detection systems, while, in other cases, a significant fraction of out-of-control situations may be missed, thereby reducing overall production yield and increasing cycle time of products in complex production lines for fabricating microstructure devices.

The present disclosure is directed to various methods and devices that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure relates to techniques and systems in which fault detection and, if desired, classification faults may be enhanced in complex manufacturing environments by taking into consideration measurement data, "quality" of process data, which may be compromised due to, for instance, a significant change of data communication rate during data transfer from a process tool to the fault detection system. It has been recognized that a deviation of the actual data rate from a target data rate, which may be caused by process tool internal management strategies, may have a significant influence on the final assessment of process conditions on the basis of efficient data reduction mechanisms, which may therefore result in frequent faulty assessments of process conditions in conventional control strategies. Consequently, in some illustrative aspects disclosed herein, the data quality may be used, for instance, in the form of a metric indicating completeness of a corresponding measurement data set, the value of the data rate and the like, in order to "re-assess" the process conditions. In some illustrative embodiments disclosed herein, the corresponding metric indicating the data quality, such as the data rate and the like, may itself be used as an input variable of the data reduction algorithm so that the "contribution" of this metric to the final assessment of the fault detection mechanism may be used for a final assessment of the process conditions. In this case, the metric indicating the data quality may thus be considered as a "virtual sensor" of the process or process tool under consideration, which may therefore be used as an additional criterion for evaluating the actual process or tool parameters and also for finally deciding whether or not a current process condition is out of control.

One illustrative method disclosed herein relates to monitoring of a production process for processing microstructure devices in a process tool. The method comprises performing a data communication process so as to communicate a plurality of measurement data at least several times during processing of a microstructure device from the process tool to a fault detection system. The method further comprises determining a data communication quality metric in the fault detection system, wherein the data communication metric indicates at least a degree of completeness of the measurement data. Additionally, the method comprises performing a fault detection process in the fault detection system on the basis of the plurality of measurement data and the data communication quality metric.

A further illustrative method disclosed herein relates to the fault detection in a semiconductor manufacturing process. The method comprises communicating measurement data for each of a plurality of process parameters of the manufacturing process to a fault detection system. Moreover, a data reduction process is performed in the fault detection system by using each of the plurality of process parameters as an input variable. The method further comprises determining a data rate metric for a data communication process used for communicating the measurement data. Additionally, the method comprises using the data rate metric as the further input variable of the data reduction process. Additionally, the method comprises assessing the semiconductor manufacturing process by using a quality metric obtained by the data reduction process on the basis of the input variables and by using a data rate contribution value indicating a contribution of the data rate metric to the quality metric.

One illustrative fault detection system disclosed herein comprises an interface configured to receive measurement data from at least one process tool used for processing a substrate, wherein the measurement data is indicative of a plurality of process parameters of the at least one process tool. The fault detection system further comprises a fault detection module connected to the interface and configured to determine a data communication quality metric that indicates at least a data rate of a data communication of the interface when receiving the measurement data. Furthermore, the fault detection module is further configured to determine a fault condition of the at least one process tool on the basis of the data communication quality metric and the measurement data.

BRIEF DESCRIPTION OF THE DRAWINGS

The disclosure may be understood by reference to the following description taken in conjunction with the accompanying drawings, in which like reference numerals identify like elements, and in which:

FIG. 1$b$ schematically illustrates the flow for assessing the status of a manufacturing process using a PCA technique in order to identify a fault condition which may require additional assessment in view of compromised measurement data quality, according to illustrative embodiments;

FIG. 1$c$ schematically illustrates a corresponding table of a basis function obtained by the PCA mechanism and corresponding contributions of process or tool parameters, which may be used as a basis for further data analysis in order to further assess any fault conditions identified by the basis function of the PCA mechanism;

FIGS. 1$d$-1$e$ schematically illustrate graphical illustrations of a process for a detailed data analysis by taking into consideration data rate issues, according to illustrative embodiments;

FIGS. 1$f$-1$g$ show graphs for illustratively demonstrating the occurrence of data rate deviations (FIG. 1$f$) and a corresponding normal distribution of actual data rates centered around the target data rate (FIG. 1$g$);

FIG. 1$h$ illustrates a scheme for incorporating a communication quality metric itself into the PCA mechanism by using corresponding metric as a further input variable "virtual sensor" of the process under consideration, according to illustrative embodiments;

FIG. 1$i$ schematically illustrates a scheme for obtaining an appropriate input variable in the form of a data communication quality metric on the basis of corresponding time stamps associated with respective measurement data, according to illustrative embodiments;

FIG. 1$j$ schematically illustrates a fault detection system operatively connected to a process tool, wherein enhanced failure detection may be accomplished by implementing a virtual data quality sensor, according to illustrative embodiments; and FIG. 1$k$ schematically illustrates a table indicating the basis function and the corresponding contributions of the actual process or tool parameters and of a virtual sensor indicating the measurement data quality, according to illustrative embodiments.

Figure 1A:
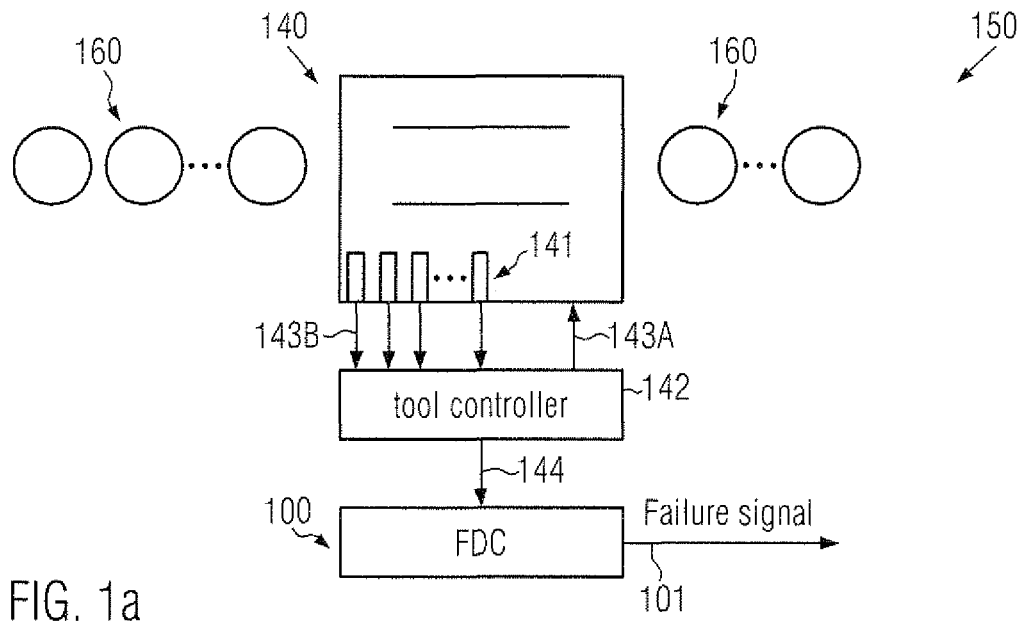
FIG. 1$a$ schematically illustrates a prior art manufacturing environment including a process tool for processing semiconductor substrates in which a fault detection and classification may be performed on the basis of a conventional strategy.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present disclosure provides techniques and systems in which reliability of fault detection may be enhanced by taking into consideration the data communication quality for measurement data transferred from one or more process tools to the fault detection system. As previously explained, typically, a large number of process and tool parameters or "sensors" have to be monitored over time, thereby creating a moderately large amount of measurement data. For an efficient overall process control, typically, a predefined frequency of data acquisition may be determined in advance so as to obtain a desired time-coverage of the corresponding tool and process parameters. For example, a target sampling rate of 2 Hz or 0.5 seconds may be used for specific process tools in which highly dynamic processes may be performed, such as etch processes, deposition processes, planarization processes and the like. For increasing responsiveness of the fault detection system, the corresponding measurement data may have to be communicated to the fault detection system with minor delay so as to allow the processing of the measurement data, for instance with respect to calculating the mean value over time and the like, which in turn may present corresponding input variables for data reduction mechanisms, such as PCA, KNN techniques and the like. On the other hand, complex process tools may typically require sophisticated control strategies, possibly based on a supervising facility management system so that a plurality of tool internal activities may have to be controlled by the tool internal control system and may have to be reported to the supervising management system. Consequently, a very large amount of tool data may be produced during the processing of substrates and may have to be communicated to external sources, such as the fault detection system, the supervising facility management system and the like. Additionally, the tool internal control system may have to respond to the current tool state, for instance, by initiating substrate transport, controlling precursor materials and the like on the basis of a predetermined process recipe so that a highly dynamic sequence of controller initiated activities may have to be serviced by the tool internal control system. Usually, these control units have implemented therein a control strategy that gives highest priority to activities which may be directly associated with substrate processing in the tool according to the specified recipe, while, on the other hand, data communication of any measurement data may be handled with reduced priority. Consequently, reading out the plurality of measurement data required by the fault detection system may be dependent on the current tool state and may, due to the tool internal hierarchy of surfacing the various requests, suffer significant data rate variations such that many measurement data may be provided with a significant delay or mean even be completely lost. Since such irregularities in data reporting to the fault detection system may cause a significant variation of one or more process parameters used as input variables of the data reduction mechanism, according to the principles disclosed herein, the data communication quality may be taken into consideration when assessing the quality of a manufacturing process so that the probability of creating a false alarm or missing an out-of-control situation may be reduced compared to conventional strategies.

In some illustrative embodiments disclosed herein, the degree of data completeness, which may be expressed on the basis of the current data rate, the time interval between successive measurement readings associated with a specific tool or process parameter and the like may be used as a further parameter of the high dimensional parameter space of the multi-variate data reduction mechanism. Consequently, upon establishing an appropriate model of the process under consideration, as explained above, the communication quality parameter, representing a sort of "virtual sensor" of the process under consideration, may therefore contribute to the one or more basis vectors or basis functions, indicating the "new" parameters having the greatest variability depending on the input parameters. Thus, a corresponding contribution of the data quality parameter may be determined on the basis of the established models and may be used for further assessing contributions of the remaining process parameters and of the basis functions used for identifying possible candidates of an out-of-control situation. By using the data quality parameter as an input variable of the data reduction mechanism, a very efficient and fast technique may be implemented in a fault detection system, thereby obtaining a substantially non-delayed responsiveness as may be desired for identifying out-of-control situations on a single wafer basis. In other illustrative embodiments, additional data quality information may be extracted from the measurement data on the basis of conventional data reduction techniques, such as PCA and the like, in order to reassess the process status obtained on the basis of the conventional techniques. In this case, an additional analysis of the measurement data at a deeper level may have to be performed in order to evaluate contributions of the various input variables, i.e., the actual process or tool parameters, in view of data integrity, i.e., degree of completeness of the measurement data, data rate and the like.

With reference to the accompanying drawings, further illustrative embodiments will now be described in more detail, wherein conventional and concepts data reduction techniques may be explained with reference to FIG. 1a.

FIG. 1a schematically illustrates a typical prior art manufacturing environment 150, which, in one illustrative embodiment, represents a manufacturing environment for producing microstructure devices, such as integrated circuits, micromechanical systems, optoelectronic components and the like. The environment 150 may comprise a plurality of process tools and metrology tools 140 wherein, for convenience, only one single process tool is illustrated in FIG. 1*a*. The one or more process tools 140 may be used for performing a plurality of process steps including actual production processes, possibly in combination with metrology processes. For example, the process tool 140 may represent a lithography tool, etch tools, implantation tools, anneal tools, deposition tools, chemical mechanical polishing (CMP) tools and the like, wherein it should be appreciated that a plurality of individual process steps, such as separate etch steps, deposition steps and the like, may be performed in a single process tool having a plurality of process chambers so as to obtain the desired process result. Consequently, the process tool 140 is appropriately configured to receive substrates 160 and perform one or more process steps under specific process conditions, which may be established on the basis of a specific process recipe. As previously explained, in complex manufacturing sequences, the recipes may frequently change due to the processing of different types of products so that a high degree of variability of the process conditions may be encountered in the process tools 140. Furthermore, even for similar process recipes, the process conditions for the individual substrates 160 may change due to tool specific variations and/or substrate specific differences which may thus result in a process result that is outside of a specified value range. For this reason, typically, a plurality of process related "sensors" 141 may be provided in order to obtain measurement readings for a plurality of process parameters. For example, many of the sensors 141 may be provided in the form of tool internal devices, for instance in the form of actual sensor elements or other hardware components, which may enable the delivery of corresponding measurement data associated with the current state of the process tool 140 and a corresponding process or process sequence performed therein. For example, the sensors 141 may be associated with process parameters, such as gas flow rates of the various precursor gases, process temperature, process pressure, specific voltages created in a plasma-based ambient, the position of hardware components, the status thereof and the like, wherein each of these parameters may have a more or less pronounced influence on the overall process result. As discussed above, the mutual complex interrelation between the various process parameters may not be known in advance and may also depend on process targets, process recipes and the like, thereby typically requiring automated data reduction and analysis techniques for estimating the quality of the current process status in the tool 140. The process tool 140 may typically comprise a tool control unit 142, which may be responsible for handling substrate transport activities within the tool 140, preparing one or more respective process chambers so as to accommodate the substrate and establishing a required process atmosphere in compliance with a specific process recipe and also to maintain the corresponding parameters values as closely as possible at the respective target values as are specified in the corresponding process recipes. Consequently, a corresponding data communication 143A, 143B may have to be established between the various hardware components of the tool 140, the sensor elements 141 and the control unit 142 so as to control the operation of the tool 140 and also read out the corresponding measurement data from the sensors 141. Moreover, the control unit 142 may further have to initiate a communication 144 with a fault detection system 100, which may be configured to detect an out-of-control situation of the process performed by the process tool 140 and to at least indicate a corresponding situation by delivering a failure signal 101, which may be used as a basis for further actions to be taken upon identifying an invalid process condition.

Consequently, during operation of the process tool 140 in the manufacturing environment 150, a plurality of substrates 160 may be supplied to the tool 140 and may pass through one or more complex process steps so as to finally leave the tool 140 in a process state, the quality of which may significantly depend on process parameters as represented by the sensors 141. Since a corresponding dynamic behavior of the process may have to be monitored with an appropriate time resolution, a target sampling interval for the sensors 141 may be established in advance in order to obtain the measurement readings from the sensors 141 with the desired time coverage in order to obtain meaningful assessments from the fault detection system 100. Thus, by enhancing the reliability of the assessment obtained by the fault detection system 100 and by reducing any delay in providing the failure signal 101 upon occurrence of an out-of-control situation, overall efficiency of the manufacturing environment 150 may be significantly increased. However, the significance of the failure signal 101 may depend on the data communication 144 and 143B, during which the current measurement data may be supplied from the process tool 140 to the system 100 since, for high data transfer rates and a moderately high number of process parameters to be monitored, the data communication resources may result in a corresponding delay or loss of measurement data, which may in turn significantly contribute to a reduced reliability of the failure signal 101.

Figure 1B:
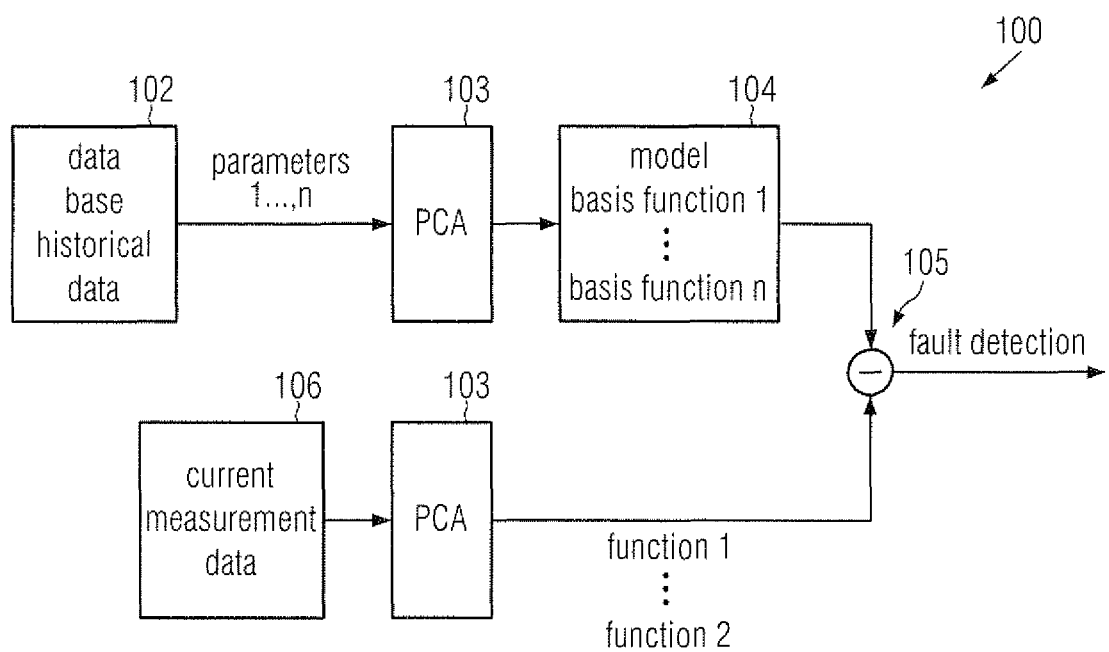

FIG. 1*b* schematically illustrates a process scheme for a data reduction technique based on PCA, which may be implemented in the system 100 and which may be appropriately extended so as to also include a metric for assessing data communication quality to provide an appropriate additional "virtual" process parameter for establishing the failure signal 101 with enhanced reliability, as described herein. As illustrated in FIG. 1*b*, the system 100 may have implemented therein source or "historical" data, for instance stored in a database 102, wherein the historical data may represent corresponding measurement readings obtained from the process tool 140 for a process situation which is considered as "normal." Thus, the historical data of the database 102 may be used as reference data and may thus represent a plurality of process parameters corresponding to a normal process situation. This historical data, i.e., the corresponding raw data, may be supplied to a PCA module 103, which may be configured to generate a model of the manufacturing process performed in the process tool 140 (FIG. 1*a*). During the building of a PCA model, the measurement data, which may typically be represented by a data matrix, is decomposed into a model component and a residual component, wherein the residual components may typically be referred to as mass relevant components. As previously explained, a PCA, a transformation determined, which maps multi-dimensional parameter space into a corresponding new parameter space having an orthogonal basis, wherein the respective base vectors are obtained such that the first base vector indicates the direction of maximum variance while the second base vector represents the direction of the second most variance and so on. By selecting one or only a few base vectors or principal components, substantially most of the variability of the input data may be covered, thereby rendering the remaining eigenvectors as less important for evaluating the associated measurement data. Consequently, by selecting one or only a few principal components, the number of dimensions of the parameter space to be taken into consideration for evaluating the process under consideration may be significantly reduced, substantially without losing relevant information with respect to the initially input measurement values and thus process parameters. It should be appreciated that, due to the "rotation" of the base vectors or principal components in the high dimensional parameter space, the principal components may thus represent "new" parameters, which may be understood as linear combinations of the previously input parameters. Consequently, the module 103 may supply one or more base vectors or eigenvectors, which may also be referred to as basis functions, thereby establishing a model 104 of the process under consideration. On the basis of the model 104, other measurement data may be evaluated on the basis of any appropriate statistical concept 105, in which current measurement data 106, which may, for instance, correspond to measurement readings obtained from the sensors 141 of the process tool 140 in FIG. 1a, may be subjected to a previously established parameter transformation in order to obtain one or more vectors or functions that correspond to the corresponding directions of the eigenvectors or functions identified in the model 104. For example, in a very simple approach, the difference between corresponding functions determined on the basis of the current measurement data 106 and the basis functions of the model 104 may be determined and may be used as a metric for quantifying the quality of the process under consideration. Thus, by appropriately setting respective statistical limits, a fault condition in the process tool 140 of FIG. 1a may be identified and the failure signal 101 may be appropriately ascertained.

Figures 1C, 1D:
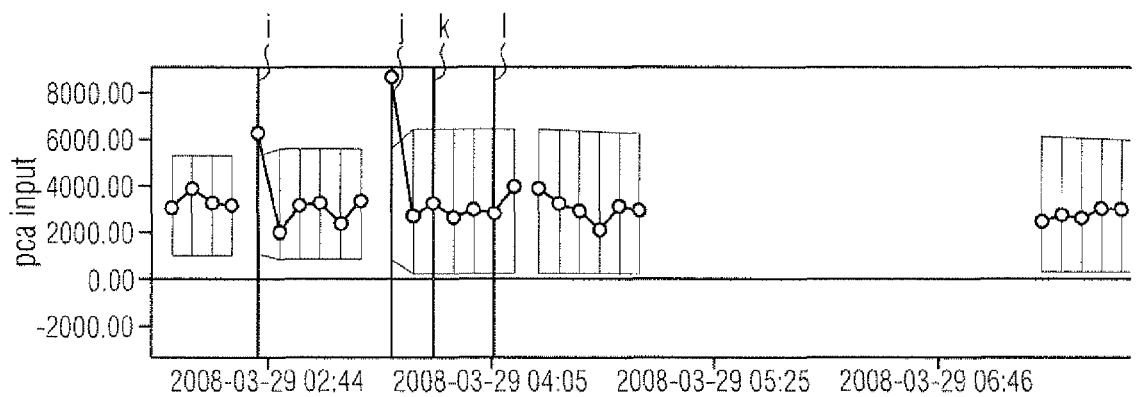

FIG. 1c schematically illustrates a table in which a manufacturing process, for instance a process as performed by the process tool 140 of FIG. 1a, may be evaluated for a plurality of substrates, for instance indicated as semiconductor wafers 1-$n$. Furthermore, a plurality of process parameters, indicated as parameters 1-$m$ may be used as input variables of the PCA mechanism, wherein, in this example, the fault detection may be based on the very first basis function 1 which, as previously explained, may indicate the direction in the high dimensional parameter space spanned by the parameters 1-$m$, which corresponds to the highest variance. In the example shown, the wafers i and j may have values for the basis function 1 of 1.1 and 1.4, respectively, which may exceed a predefined statistical limit in the corresponding statistical feature 105 of FIG. 1b. Consequently, the wafers i and j may represent an invalid process condition and may thus create an alarm which may result in specific activities, such as the shutting down of the process tool 140 and the like. As previously explained, corresponding fault-triggered activities may result in an undue increase of overall cycle time when one or more of the corresponding alarms may finally be identified as false alarms. On the other hand, other substrates may have actually been processed under invalid conditions, which may not be reflected in the values of the basis function 1. Due to the complexity of the data reduction process, for instance based on the CPA technique, a corresponding further evaluation may not be readily accomplished on the basis of the various contributions of the parameters 1-$m$ of the basis function 1 so that, according to one illustrative embodiment, a further assessment of at least substrates i and j may be performed on the basis of measurement data quality, as previously explained. For this purpose, a more detailed analysis of the associated measurement data may be applied.

FIG. 1d schematically illustrates a graph representing one input variable used in the PCA data reduction process, as previously described. For example, the input variable listed in FIG. 1d may represent any of the parameters 1-$m$ wherein, however, typically, corresponding mean values may be defined on the basis of the original raw data. That is, a plurality of individual measurement readings obtained on the basis of the current data rate may be processed to determine a mean value which may then be used as an input parameter for defining the corresponding PCA model and the current basis function and related contributions as, for instance, shown in the table of FIG. 1c. For example, in FIG. 1d, respective mean values of a specific process parameter are illustrated with corresponding statistical limits, such as a band width of 2.8δ, wherein the corresponding mean values for the parameter under consideration may be without the as "normal" considered narrow band for the wafers i and j. That is, these wafers may exhibit with respect to the parameter under consideration a significant deviation from the "normal" value range. For comparison, corresponding mean values for wafers k and l, which may be considered as being processes during "normal" process conditions, are also indicated. However, the significant deviation of the specific PCA input variable of FIG. 1d may have to be further assessed in order to identify a potential data rate issue that may have caused the significant deviation. For this purpose, the data analysis may be extended to a further lower level in which the time-granularity of the measurement data may become visible.

Figure 1E:
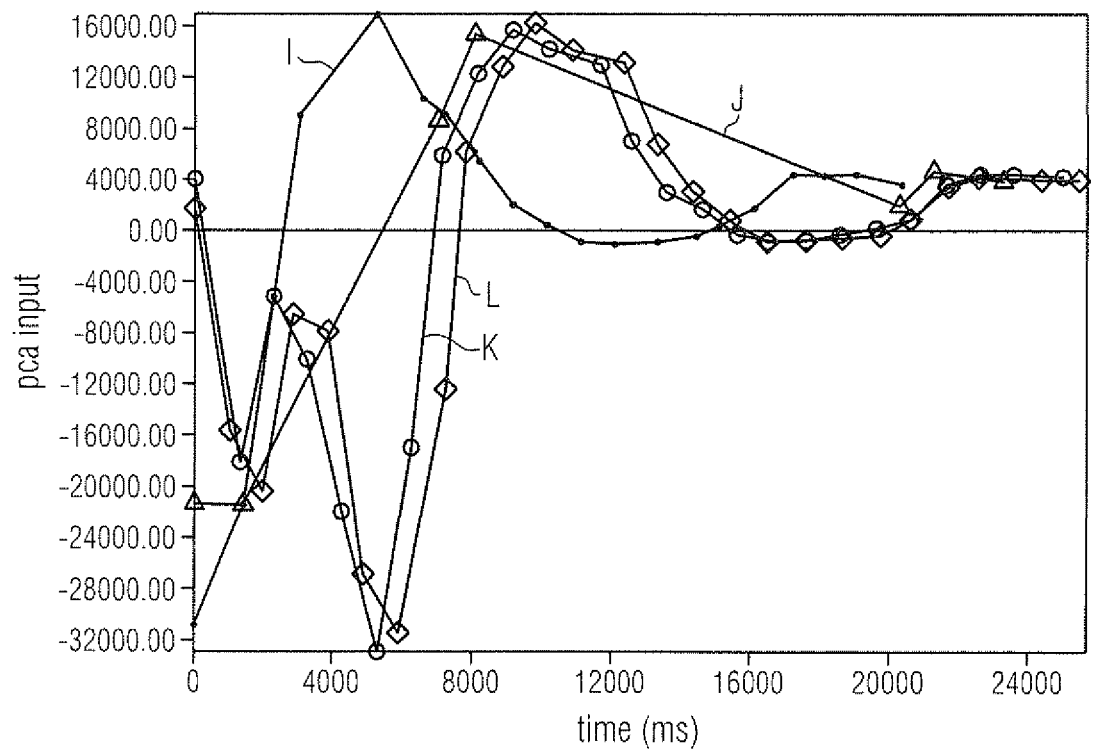

FIG. 1e schematically illustrates the corresponding actual measurement readings for the wafers I, J, K and L, wherein these measurement readings have been used for determining the corresponding mean values shown in FIG. 1c. For convenience, the corresponding curves are also indicated as curves I, J, K and L. As is evident from FIG. 1e, curves K and L may represent "normal" process conditions. On the other hand, curve I illustrates that a significant deviation from the distribution of the curves K and L has occurred during the processing of the wafer I, wherein, however, the corresponding individual measurement readings may not indicate a significant interference during the data transmission since the number and the time intervals between successive individual measurement readings is substantially the same in curves I, K and L. Consequently, since any severe problems during data communication for the wafer I may be excluded, wafer I may actually represent an out-of-control situation and thus the corresponding fault alarm may be considered as a real fault situation. On the other hand, curve J may represent a significantly reduced number of measurement readings, thereby indicating that a significant loss of measurement data may have occurred, which may thus contribute to the significant deviation of the mean value in FIG. 1d for the wafer J. Consequently, it is not possible to decide whether the wafer J has been processed on the basis of good or invalid process conditions. Due to this fact, the fault alarm based on wafer J may be considered as an irrelevant alarm and may be ignored. Consequently, during the fault detection mechanism represented by the process of FIGS. 1b-1e, for instance using the fault detection system 100 as illustrated in FIG. 1a, the reliability of the fault detection may be significantly enhanced by taking into consideration the quality of the data communication between the process tool 140 and the system 100 (FIG. 1a).

Figure 1F:
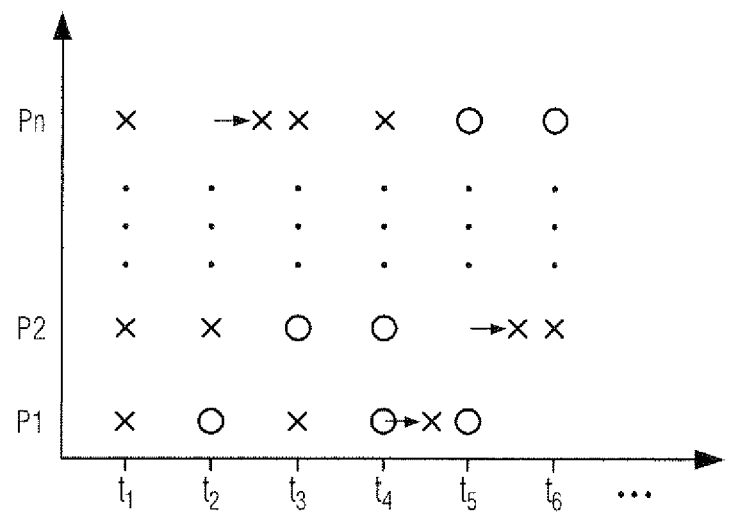
Figures 1G, 1H:
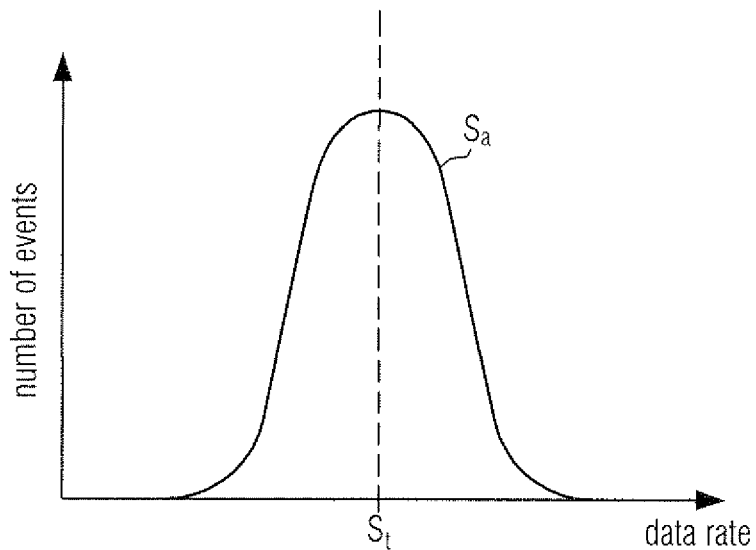

With reference to FIGS. 1f-1h, further illustrative embodiments will now be described in which a quantitative measure or metric of the data communication quality may be established which may then, in some illustrative embodiments, be directly used as an input parameter for the data reduction mechanism implemented in the corresponding fault detection system.

FIG. 1f is a representation in which the time progression of a data communication may be illustrated. Thus, the horizontal axis may represent the time during operation of a process tool, such as the tool 140 of FIG. 1a, wherein a corresponding target sampling rate may be determined in advance in accordance with process requirements. That is, at certain regular time intervals, a measurement reading for each of a plurality of parameters P1 . . . Pn may be initiated, wherein the time resolution, i.e., the sampling rate, may be selected so as to obtain a desired coverage of the process under consideration. For instance, a sampling rate of 2 Hz or a time interval of 0.5 seconds may be used, while it should be appreciated that any other sampling rates may be applied as required. As illustrated, at time $t_1$, measurement readings for all of the parameters P1 . . . Pn may be obtained, while, at time $t_2$, the parameter value for parameter P1 may be lost due to any data communication issues, as previously explained. Moreover, in the example illustrated, the measurement reading for parameter Pn may be obtained at a later time due to sufficient communication resources and the like. Similarly, in one or more data points in time $t_3$, $t_4$, $t_5$, $t_6$, etc., one or more irregularities in the data communication may occur, for instance a loss of measurement readings or a delay thereof may occur.

FIG. 1g schematically illustrates a distribution of a metric indicating the quality of data communication. In the example shown, the data rate may be used as an appropriate data communication quality metric, wherein the data rate may be defined as the number of information units transferred to the fault detection system at the various points in time $t_1$, $t_2$, $t_3$, etc. It should be appreciated that the points in time $t_1$ . . . may be considered as moderately small time intervals compared to the interval defined by successive points in time $t_1$, $t_2$ and the like. Ideally, the data rate would be represented as a vertical line intercepting the "data rate" axis at the target sampling rate $S_t$. However, due to corresponding data communication issues, as previously explained, the actual data rate may be represented by a normally distributed curve, indicated as $S_a$, so that, in this case, an appropriate additional or virtual parameter $S_a$ may be defined, which may be used as a parameter or "sensor" of the process under consideration, which explicitly reflects the quality of the measurement data that may be influenced by data communication interferences, as previously explained.

Consequently, the list of input parameters P1 . . . Pn may be completed by an additional parameter $S_a$ that may represent the momentary data rate associated with each of the points in time $t_1$ . . . Thus, in some illustrative embodiments, the various parameter values $S_a$ may be used as additional parameter values and may therefore also be applied during establishing a corresponding model for the process under consideration, as is previously explained for the parameters 1 . . . n in the context of FIGS. 1b-1e.

FIG. 1h schematically illustrates the scheme for defining a data communication quality metric according to further illustrative embodiments. As illustrated, each of the parameters P1 . . . Pn may have dedicated measurement readings associated with a time stamp, which may ideally be identical with the times $t_1$ . . . , however, as explained above, may respond to other points in time due to the loss of several measurement readings or any delay thereof. As illustrated, individual measurement readings may be indicated as MP1 . . . MPM, each of which has a dedicated time stamp which may be illustrated as time stamps $t_1$ . . . $t_n$. That is, the index N may represent a total amount of individual measurement readings corresponding the entirety of parameters P1 . . . Pn. Thus, in one illustrative embodiment, a data creation quality metric indicated as QM1 . . . $QM_{n-1}$, may be defined by determining the difference of two successive instrument readings associated with the same process parameter. For example, time stamps $t_1$ and $t_2$ correspond to the time stamps of two successive readings of a specified parameter, such as parameter P1, the quality metric QM1 may be defined by $t_2$-$t_1$. Thus, from the plurality of quality metrics QM1 . . . $QM_{n-1}$, which thus represents a further parameter for the data reduction mechanism, a quality parameter may be defined, for instance, by calculating a corresponding mean value, as indicated in FIG. 1h. Thus, the corresponding mean value may then be used as an input of the PCA technique or any other algorithm for determining the corresponding model of the process under consideration, as previously explained.

Figure 1I:
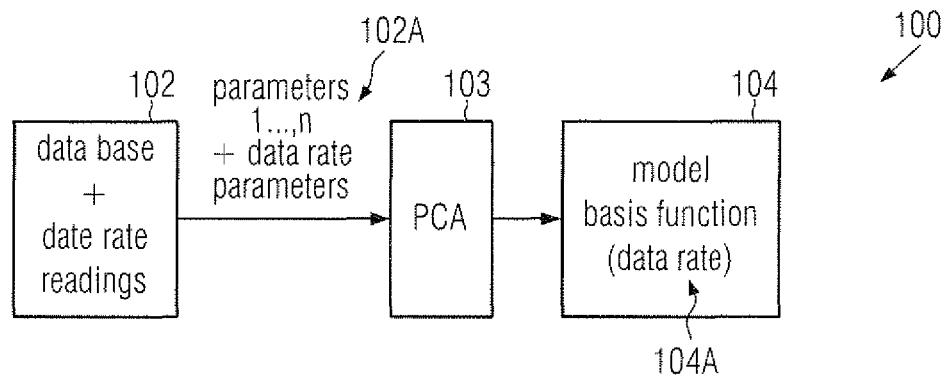

FIG. 1i schematically illustrates a part of the functional blocks of the system 100 according to illustrative embodiments in which data communication quality metrics, such as the metrics QM1 . . . $QM_{n-1}$ of FIG. 1h, or corresponding data rate values $S_a$ (FIG. 1g) may be used as a further "process parameter." As illustrated, the database 102 may now include appropriate data rate readings such as the values illustrated in FIG. 1h or 1g. On the basis of these measurement readings, corresponding input variables corresponding to the parameters 1 . . . n may be obtained, while a corresponding data rate parameter 102A may be represented as an input variable for the PCA or any other data reduction mechanism 103, for instance by defining an appropriate mean value, as previously discussed. Thereafter, the mechanism 103 may provide the model 104 in the form of an appropriate number of basis functions, wherein the respective contributions of the parameters 1 . . . n and the data rate parameter 102A may also be included. Thus, the model 104 may comprise a contribution 104A related to the data communication quality, as discussed above.

Figure 1J:
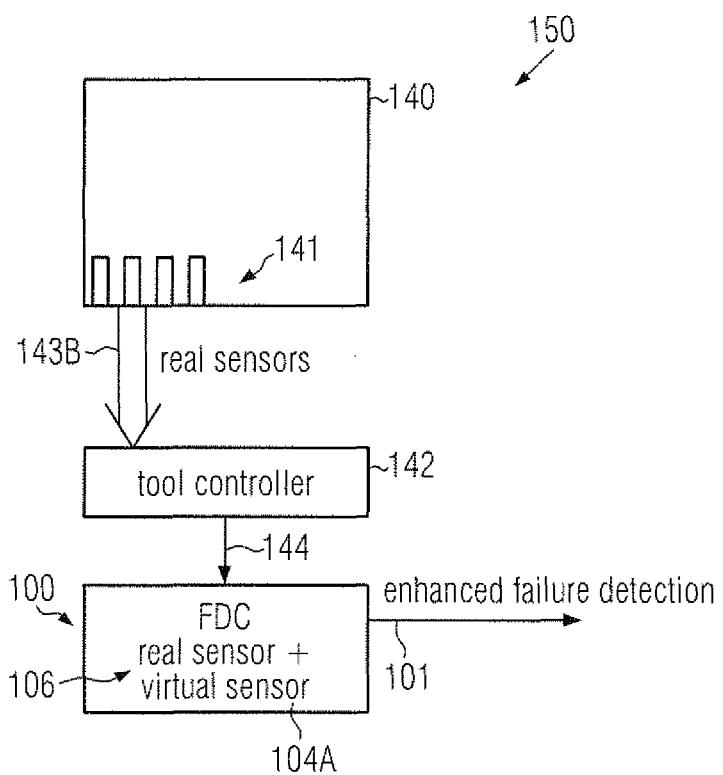

FIG. 1j schematically illustrates the process tool 140 in the manufacturing environment 150, wherein the fault detection system 100 may have implemented therein the model portion 104A representing a virtual sensor reflecting the data communication quality as described above. Thus, upon operation of the process tool 140, the process and tool sensors 141, which may be considered as real sensors, may communicate the corresponding measurement readings on the basis of the data communication process 143B to the tool controller 142 and finally to the system 100 via the communication process 144, as also previously discussed. Consequently, the system 100 has implemented therein the model based on the real measurement readings 106 and including the virtual sensor portion 104A so that a further assessment of the basis function may be accomplished on the basis of the corresponding contribution resulting from the virtual sensor 104A.

FIG. 1k schematically illustrates a table obtained on the basis of the system 100 as illustrated in FIG. 1j. As illustrated, the wafers 1 . . . n represent the same example as illustrated in the table of FIG. 1c. Thus, basis function 1 may be used for evaluating the quality of the process under consideration, wherein the real sensors or parameters 1 . . . n may have the same measurement readings as in the previously explained example. Consequently, the corresponding contributions may have similar values, thereby resulting critical values of the basis function 1 for the wafers i and j. Moreover, a quality parameter, i.e., a parameter corresponding to the model portion 104A (FIG. 1j), may also be determined since this parameter may be treated as an input for the data reduction mechanism, thereby also obtaining respective contributions to the basis function 1. As illustrated, the quality parameter may exhibit a moderately high value, which may exceed a specifically defined statistical limit, thereby indicating a significant contribution to the basis function 1. On the other hand, if the contributions associated with the parameters 1 . . . n may be within any predefined statistical limits, the corresponding value of the basis function may be not trusted since a significant data communication problem has occurred. In this case, the fault alarm that may be triggered by wafer j may be disregarded. On the other hand, the contribution of the quality parameter for wafer i may be well within a valid value range, thereby indicating a high degree of completeness of the corresponding measurement readings so that the contributions of the remaining real parameters 1 . . . n may have caused the invalid value of basis function 1, thereby indicating wafer i as having experienced an invalid process condition. Thus, an actual fault signal may thus be issued for wafer i, only thereby significantly reducing the probability of creating a false alarm. In still other illustrative embodiments, the contributions of the quality parameter may be used as a measure of quality or trust for the measurement data used for the fault detection analysis. For example, in cases when the input variables, i.e., the mean values of the actual measurement readings, do not strongly deviate from the "normal" mean values, for instance any missing measurement readings may not significantly shift the mean value, the quality parameter may nevertheless exhibit moderately high values, as is, for instance, shown for wafer j, thereby providing a general measure for the quality of the applied measurement readings.

As a result, the present disclosure provides systems and methods for enhancing the reliability of fault detection systems by taking into consideration the quality of the data communication process. For example, the probability of creating a false alarm may be significantly reduced since the influence of missing or delayed measurement readings on the assessment obtained by well-established data reduction techniques, such as PCA, may be evaluated on the basis of the degree of measurement data quality. In some illustrative embodiments, the data communication quality metric may be introduced into the fault detection procedure as an input variable, which may thus produce corresponding contributions that may be readily compared with the respective contributions of the real process parameter in order to quantitatively evaluate quality of measurement reading, thereby also enabling an efficient exclusion of false alarms.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of monitoring a production process for processing microstructure devices in at least one process tool, the method comprising:
    performing a data communication process so as to communicate a plurality of measurement data at least several times from said at least one process tool to a fault detection system during processing of a microstructure device;
    determining a data communication quality metric in said fault detection system, said data communication quality metric comprising a momentary data rate between successive measurements generated for each of the plurality of measurement data and indicating at least a degree of completeness of said measurement data; and
    performing a fault detection process in said fault detection system using said plurality of measurement data and said data communication quality metric as inputs to the fault detection process.

2. The method of claim 1, wherein said measurement data represents values of a plurality of process parameters and wherein performing said fault detection process comprises performing a multivariate data reduction using each of said plurality of process parameters as an input variable.

3. The method of claim 2, wherein performing said multivariate data reduction comprises using said data communication quality metric as a further input variable.

4. The method of claim 2, wherein performing said multivariate data reduction comprises performing at least one of a principal component analysis (PCA) or a k nearest neighbor (KNN) analysis.

5. The method of claim 1, wherein determining said momentary data rate further comprises subtracting respective time stamps of two subsequent measurement data items that are associated with the same process parameter.

6. The method of claim 1, wherein performing said fault detection process comprises indicating a fault condition of said production process when a first process quality metric is outside a valid process quality range and said data communication quality metric is within a predefined valid communication quality range.

7. The method of claim 6, wherein performing said fault detection process further comprises disregarding a second process quality metric that is outside said predefined valid process quality range when said data communication quality metric is outside said predefined valid communication quality range.

8. The method of claim 7, wherein performing said fault detection process further comprises determining, on the basis of said data communication quality metric, a contribution of said measurement data to a third process quality metric that is within said predefined valid process quality range.

9. The method of claim 8, wherein determining said contribution comprises identifying a part of said measurement data as non-influential data when said data communication quality metric exceeds a predefined threshold.

10. A method of fault detection in a semiconductor manufacturing process, the method comprising:
    communicating a plurality of measurement data for each of a plurality of process parameters of said manufacturing process to a fault detection system;
    performing a data reduction process in said fault detection system by using each of said plurality of process parameters as an input variable;
    determining a momentary data rate metric between successive measurements for each of the measurement data provided by a data communication process used for communicating said measurement data;
    using said momentary data rate metric as a further input variable of said data reduction process; and
    assessing said semiconductor manufacturing process by using a quality metric obtained by said data reduction process and generated using said input variables and a data rate contribution value indicating a contribution of said momentary data rate metric to said quality metric.

11. The method of claim 10, wherein assessing said semiconductor manufacturing process comprises indicating a fault condition of said semiconductor manufacturing process when said quality metric is outside a predefined valid process quality range and said data rate metric is within a predefined valid value range.

12. The method of claim 11, wherein assessing said semiconductor manufacturing process comprises indicating said quality metric as non-conclusive when being outside of said predefined valid process quality range and when said data rate metric is outside said predefined valid value range.

13. The method of claim 10, wherein determining said momentary data rate metric comprises using respective time stamps associated with each of said measurement data.

14. The method of claim 10, wherein performing said data reduction process comprises establishing a model of said semiconductor manufacturing process on the basis of reference measurement data of said manufacturing process.

15. The method of claim 14, wherein said model is established using one of a principal component analysis (PCA) or a k nearest neighbor (KNN) analysis.

16. The method of claim 10, wherein said measurement data of said plurality of process parameters is obtained for each of a plurality of substrates that are processed in said semiconductor manufacturing process.

17. The method of claim 10, wherein determining said momentary data rate metric comprises determining a time interval between two subsequent measurement data items that are associated with the same process parameter.

18. A fault detection system, comprising:
an interface configured to receive a plurality of measurement data from at least one process tool used for processing a substrate, said measurement data being indicative of a plurality of process parameters of said at least one process tool; and
a fault detection module connected to said interface and configured to determine a data communication quality metric indicating at least a momentary data rate between successive measurements of a data communication of said interface when receiving said measurement data for each of the plurality of measurement data, said fault detection module further being configured to determine a fault condition of said at least one process tool using said data communication quality metric and said measurement data as inputs to said fault detection module.

19. The fault detection system of claim 18, wherein said fault detection module has implemented therein at least one of an principal component analysis (PCA) algorithm or a k nearest neighbor analysis (KNN) algorithm.

20. The fault detection system of claim 18, wherein the fault detection module determines said momentary data rate by determining a time interval between two subsequent measurement data items that are associated with the same process parameter.

* * * * *